July 12, 1938.  E. RACZ  2,123,590
CALCULATING MACHINE
Filed Sept. 28, 1936  3 Sheets-Sheet 1

INVENTOR
Ernest Racz
BY
Davis, Lindsey, Smith & Shonts
ATTORNEYS

July 12, 1938.  E. RACZ  2,123,590
CALCULATING MACHINE
Filed Sept. 28, 1936  3 Sheets-Sheet 2

INVENTOR
Ernest Racz
BY
Davis, Lindsey, Smith & Shonts
ATTORNEYS

July 12, 1938.

E. RACZ 2,123,590

CALCULATING MACHINE

Filed Sept. 28, 1936

INVENTOR
Ernest Racz
BY Davis, Lindsey, Smith & Shonts
ATTORNEYS

Patented July 12, 1938

2,123,590

UNITED STATES PATENT OFFICE 2,123,590

CALCULATING MACHINE

Ernest Racz, Detroit, Mich., assignor to Burroughs Adding Machine Company, Detroit, Mich., a corporation of Michigan Application September 28, 1936, Serial No. 102,868

12 Claims. (Cl. 197—128)

This invention relates to a calculating machine and is more particularly concerned with the paper controlling equipment of a machine of this character. The invention is an improvement over my prior invention disclosed in my prior Patent No. 2,081,836 for Calculating machine issued May 25, 1937. As in my prior patent, the present invention is illustrated in connection with a type of calculating machine sometimes called a "Cash receipting machine" because it is often used to issue receipts for cash payments made by customers of the owner of the machine.

In certain lines of business, for example, in the public utility business, it is desirable when a customer presents his bill for payment in cash, not only to be able to return to the customer a receipted bill, but also to be able to keep a record of the payment. The present invention concerns a machine in which a customer's bill may be quickly and easily inserted into a machine by front feeding it with relation to a platen which, preferably, has a record strip or sheet about it on which a record of all payments is kept.

In use, the bill is inserted and the platen moved to printing position, the amount of the payment is entered on the keys of the machine, and the machine is operated, as a result of which the amount of the payment and sometimes also the date are printed on a portion of the bill called the stub. Similar impressions are also made on the record strip. Provision is made for then automatically moving the bill to a second printing position where the amount of the payment is printed on the main or "receipt" portion of the bill, and the "stub" on which the printing first occurred is cut off and dropped into a locked container for the use of the manager of the department in checking the cash. During this second operation the amount of the payment is entered in a register which accumulates the cash receipts for the day. When the machine completes its operation the "receipt" portion of the bill is automatically released so that the cashier can remove it quickly and hand it to the customer. At the end of the day, the manager balances the stubs in the locked compartment with the cash received for the day and with the total recorded on the cash register. This provides a check on the cash and on the employees, and at the same time the customer receives a receipt on which is recorded the amount of his payment.

In my prior patent, I have disclosed a machine provided with a number of novel features which cooperate in performing the functions mentioned. In accordance with my present invention, as disclosed in this application, I have conceived and disclosed additional improvements which facilitate and speed up the operation of the machine and make it possible to receive and handle customers' bills with greater expediency.

The general object of the invention is to provide an improved machine of the general character mentioned.

A more particular object is to provide an improved front feed mechanism for a machine of the character described.

Another particular object is to provide improved holding means which will support an inserted sheet and prevent displacement thereof during movements of the platen toward printing position.

Other objects and advantages of the invention will appear from the following specification and drawings illustrating one embodiment of the invention and in which.

Figure 1:
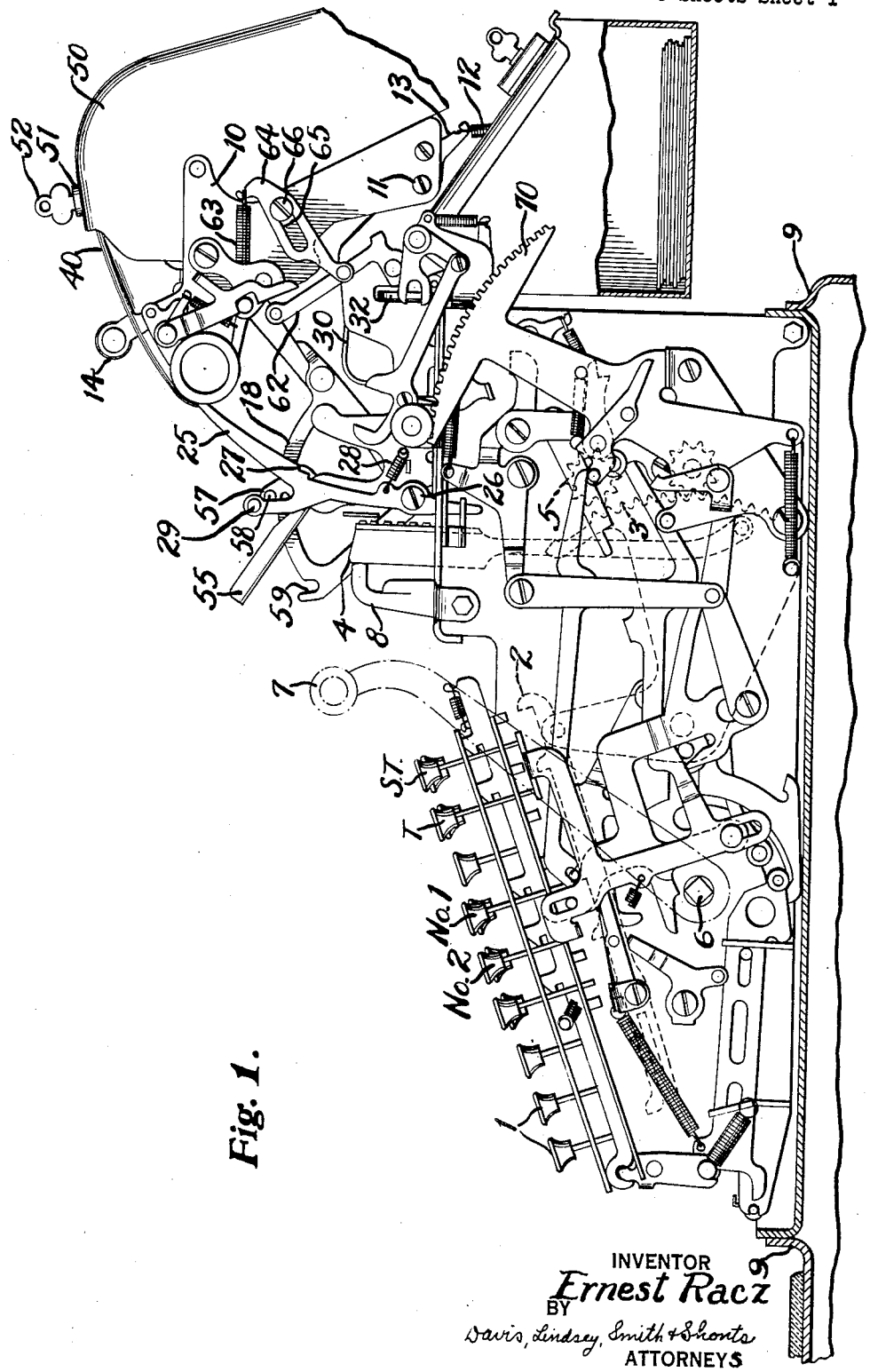
Figure 1 is a right side elevation of a machine embodying this invention with the parts in position for receiving a front-fed-work sheet or bill.

The invention is shown applied to a calculating machine of the "Burroughs portable" type shown in the Horton Patent No. 1,853,050 and in my prior mentioned application and British patent. Only such parts of this machine as are more particularly related to the present invention have been illustrated in the drawings and the description of the machine will be made very brief, reference being made to heretofore mentioned patent for further description of the machine.

The machine has a plurality of banks of depressible amount keys 1 (Fig. 1) which control differential stop bars 2 that are connected to actuator racks 3 which, in turn, have the type bars 4 connected to them. Associated with the actuator racks 3 are one or more registers 5. The machine is provided with a main drive shaft 6 which may be oscillated by means of a handle 7 or by means of a motor not shown but illustrated in the Horton patent referred to.

In entering an item, the amount keys are depressed and the machine is given a forward and return stroke of operation which results in differentially positioning the actuator racks and type bars after which the printing mechanism, including the hammers 8, operates to print the amount. The registers 5 are suitably controlled to engage the actuator racks to add or subtract the amount entered as described in the said Horton patent.

A plurality of control keys are provided at the right side of the keyboard, including the total key T and sub-total key ST and special control keys No. 1 and No. 2, for controlling the operations of the machine as disclosed in my prior Patent No. 2,081,836. The registers 5 are controlled by the total and sub-total keys in a well-known manner to enable a total and sub-total to be taken from the machine. The machine is preferably mounted on a cash drawer 9, portions of which are shown in Fig. 1, so that a receptacle for the receipt of cash is conveniently available for the operator.

In order that the customer's bill may be quickly and easily inserted into the machine, provision is made for front feeding the bill with reference to the platen without disturbing the record sheet that is held in feeding and printing relation about the platen. A "throat" for receiving front-fed bills or work sheets is provided and this throat is open when the machine is in condition to receive the bill. After the bill is inserted, the throat may be closed and the machine operated. When operations have been completed, the throat is automatically opened to permit one work sheet or receipt to be readily removed and another inserted.

Platen mounting

The machine is provided with a platen P that is movable to and from printing position relatively to the printing mechanism of the machine. The platen P is rotatably mounted in two side plates 10 which constitute a rocking platen frame, the plates being pivoted at 11 to the top plate of the machine. The rocking platen frame is urged to upper or open throat position away from the printing mechanism by spring 12 connected to a crank 13 pivoted to the platen frame and having one arm engaging the pivot 11 of the frame.

The platen frame may be moved from open throat to closed throat, or printing position, by means of a handle 14 carried upon one end of a bell crank 15 pivoted at 16 to the upper end of one side plate 10. The other arm of crank 15 is pivoted at 17 to one arm of a quadrant 18 pivoted at its center at 19 to the top plate of the machine. The crank 15 and the quadrant 18 constitute a toggle connection by means of which the platen frame is moved. A spring 21 connected to pivot 16 and to a finger 22 projecting from the quadrant tends to strengthen the toggle connection and urge the platen frame to upper or open throat position. The pivotal point 11, the side plates 10, and the toggle connection are so chosen and arranged that the platen P in open throat position is sufficiently raised that the operator may insert his hand into the throat for purposes which will be later explained.

The platen may be latched in printing position by a releasable pivoted latch lever 25 pivoted at 26 to the top plate of the machine. The lever has a shoulder 27 which engages one side plate 10. The latch is normally urged to latched position by a spring 28 and may be released manually, during operation of the machine by means of a handle 29 fastened to one arm, or it may be automatically released. Release of the latching lever 25 permits springs 21 and 12 to move the platen away from printing position, which movement opens up a space or throat between the platen and certain cooperative portions of the carriage including the paper table, later described, and the printing mechanism to enable a work sheet to be front-fed in substantially horizontal position beneath the platen. Forward pull on handle 14 breaks the toggle connection and lowers the platen to close throat or printing position.

In work of the type for which this machine is especially adapted, it is frequently, if not usually, necessary to insert a bill or work sheet presented by a customer which sheet is received in wrinkled or crumpled condition. The machine must, therefore, be capable of receiving, positively holding and feeding these badly wrinkled sheets rearwardly to a sheet end stop 30 and to a cut-off knife 32 which severs the stub of the sheet, as explained in my prior patent. If the badly wrinkled sheets are not properly positioned and positively fed, the stub will not be severed at the right place. The present invention provides sufficient room beneath the platen when it is in open position that the operator may, if necessary, insert his hand within the open throat and properly position a wrinkled bill against the stop 30.

Record sheet mounting

Figure 3:
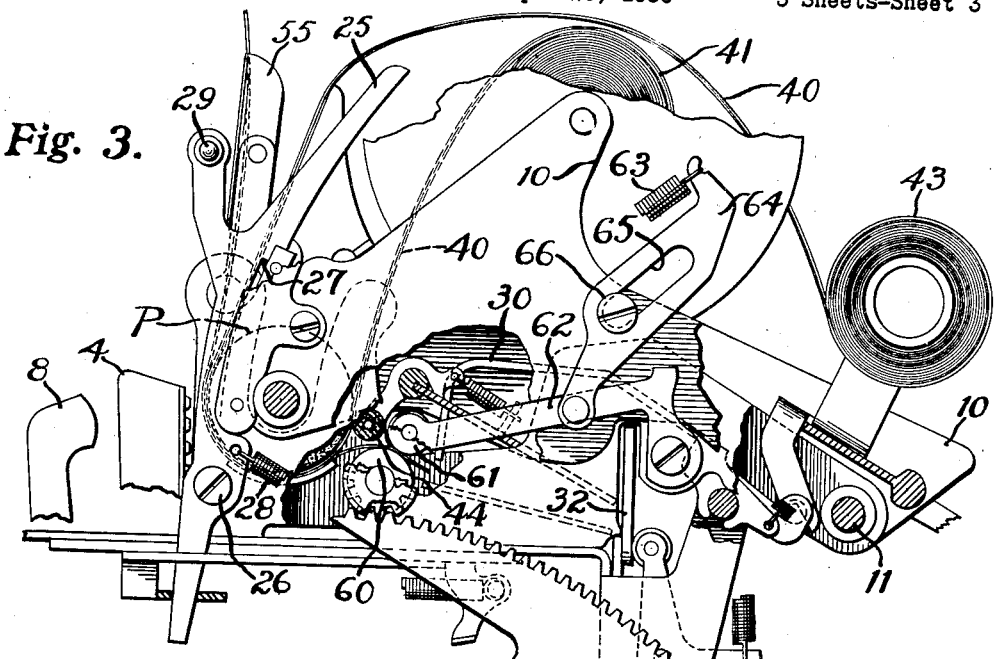
Fig. 3 is a partial left side elevation illustrating the improved carriage construction with the platen moved to printing position and with the paper throat closed.

The record sheet shown in the present case is a narrow continuous strip 40 which is fed from a supply roll 41 under the platen P up and over an autographic table 42 and back to a storage or take-up roll 43 which is spring-urged in a direction to take up the slack in the strip. Both the supply roll 41 and storage roll 43 are mounted on the rocking platen frame that supports the platen P and move with it. Record strip 40 is held in feeding relation to the platen by means of feed rolls 44 (one of which is shown in Fig. 3).

In order to prevent unauthorized access to the supply roll and storage roll an enclosing casing 50 (Fig. 1) is provided which is equipped with a lock 51 controlled by a key 52.

Line spacing mechanism is provided for the platen in order to feed the record strip from time to time but this mechanism is not shown and a description thereof will be found in my prior patent heretofore referred to.

Front feed table

A front-feed table 55 is provided for receiving and guiding the work sheets or bills under the platen from the front and with the work sheets inclined slightly but substantially in horizontal position. This table is mounted so that it can be swung from its substantially horizontal or front-feed position to substantially vertical position to form the work sheets around the platen and to hold them in against the platen for printing.

The front-feed table 55 is pivoted to the stationary side plates of the machine at 56 (Fig. 2) and is provided with an arm 57 which carries a stud 58. This stud engages the arcuate portion of the quadrant 18 during the major portion of the movement of the quadrant and retains the table to its substantially horizontal position. During the final portion of the movement of the quadrant and after the platen has been lowered to printing position and after the papers have been gripped as will hereinafter be described, stud 58 is engaged by the notched end 59 of the quadrant which forces table 55 counterclockwise about its pivot 56 to its substantially vertical position (Figs.

Figure 2:
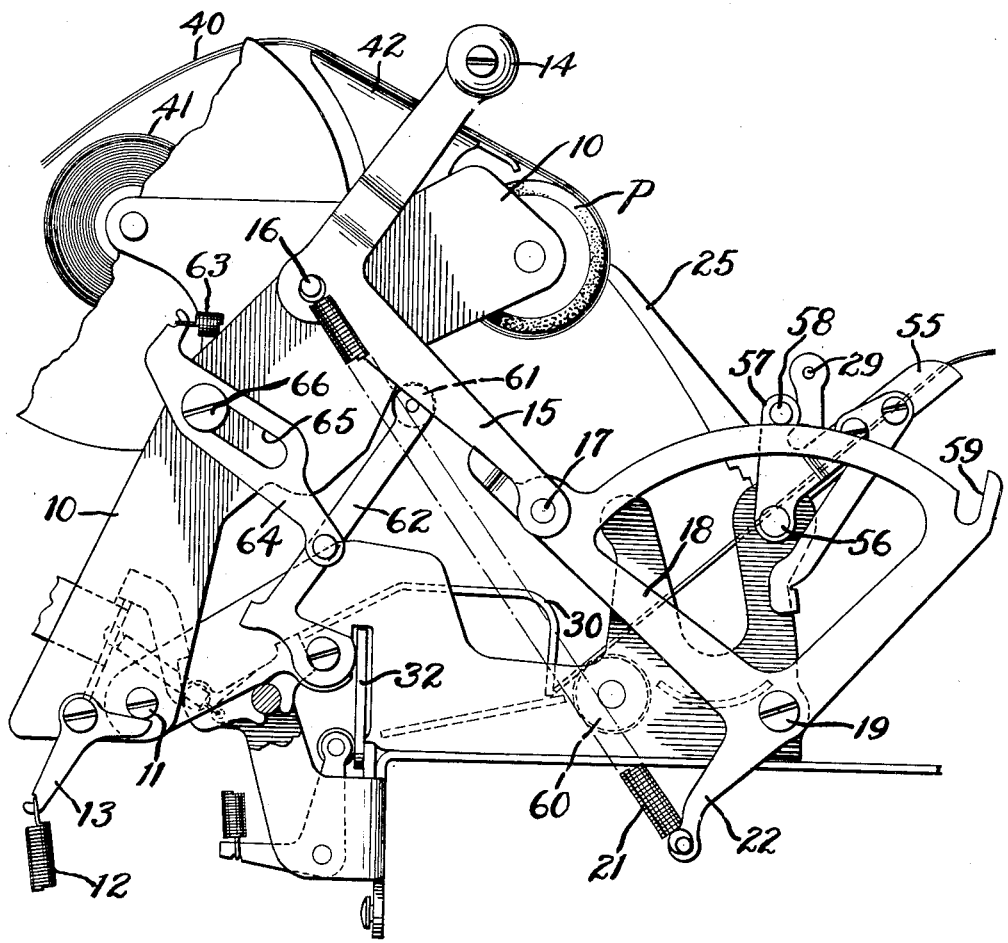
Fig. 2 is a partial left side elevation illustrating the improved carriage construction with the platen frame moved to throwback or open throat position to receive a work sheet.

3 and 4). On the return movement of the quadrant 18 and at the initial portion thereof, table 55 is swung clockwise about its pivot to its substantially horizontal or front-feed position, after which upward movement of the platen is completed to its open-throat position away from printing position as shown in Figs. 1 and 2. In this position a single sheet or plurality of sheets may readily be front-fed under the platen and collated, if necessary. As the table swings to vertical position it tends to move the front unfed ends of the work sheet to vertical position and in so doing bends the sheet around the platen and holds it about the platen at the printing line so that the sheet is held properly for printing.

As previously stated the platen and certain cooperative parts of the frame function to permit front-feeding of work sheets and the space between the platen and the portions of the stationary frame with which it cooperates including the front-feed table form what may be called a "front-feed throat" into which work sheets may be fed. When the platen is raised it is in what may be termed "front-feed" position and, at that time, this throat is open. When the platen is moved to printing position, the throat is closed.

Work sheet receiving and holding means

One of the improved features of the present machine is that the separate front-feed means for receiving and holding the work sheets independently of the platen is moved in a novel manner. This work sheet holding means embodying a second front-feed throat is movable from closed to "open-throat" position and vice versa, and is arranged to be in "open-throat" position when the platen is out of printing or in front-feed position. Means are provided for automatically closing the throat to grip the inserted work sheet prior to any appreciable movement of the platen and prior to its contact with the work sheet. The work sheet holding means includes a lower pressure roll 60 journaled in the stationary side plates of the machine and a cooperating upper pressure roll 61 journaled in the ends of a pair of pivoted arms 62, one arm being on each side of the rocking platen frame. The arms are urged clockwise, as viewed in Fig. 2, by springs 63 which urge arms 62 and pressure roll 61 toward engagement with lower roll 60.

Movement of the arms 62 is controlled by a link 64 pivoted to one arm 62 intermediate its ends, and having a slot 65 for receiving a stud 66 carried by one of the side plates 10. The position of stud 66 and the pivotal connection of link 64 and arm 62 are such that roll 61 will move faster than platen P when the latter is lowered and will engage roll 60 to grip the work sheet long before the platen engages or even touches the work. This insures that the work sheet will positively be held by the rolls 60 and 61 before the platen starts to bend the work sheet about the platen into the printing position of Figs. 3 and 4. Furthermore, the rolls 60 and 61 engage the work sheet gradually rather than suddenly. When the platen is again moved out of printing position to "open-throat" position, link 64, of course, raises arm 62 and accordingly roll 61 to "open-throat" position. It will be noted that the lever 14 which is used to move the platen to and from printing position, not only accomplishes this result, but, when moving in one direction acting through the platen frame, it also closes the front-feed throat, tilts the paper table and closes the second front-feed throat. In moving the handle in the other direction, the paper table is tilted to front-feed position and the two throats are opened.

Work sheet feeding means

Provision is made for feeding the work sheets rearwardly to a new printing position and to a position where the stub may be severed from the receipt portion of the sheet, as disclosed in my prior application and the British patent referred to. This feeding movement is in a direction opposite to that in which the platen is moved during its line spacing movements. In fact, the work sheet is moved independently of the platen and while the latter is stationary in its printing position.

Referring to Figs. 1 and 3, it will be observed that the shaft of the lower pressure roll 60 has a toothed gear on the end thereof, which meshes with an arcuate rack 70, which is actuated during the latter part of the machine operation under control of the No. 1 key, as is disclosed in my prior patent. To insure positive rotation of both rolls 60 and 61, their shafts are provided with intermeshing gears 71, 72 (Fig. 4) which positively rotate the rolls whenever rack 70 is moved. This makes it possible to have lighter contact between the pressure rolls and still insure positive feeding. Accordingly, when rack 70 is moved, the work sheet is fed rearwardly to cut-off position and later returned into the table 55 where it may be grasped by the operator. This movement of the work sheet does not disturb the record sheet which is held about the platen by the additional feed rolls previously mentioned.

Line spacing of platen and record sheet

The platen P is automatically line spaced during a second operation of the machine under control of the No. 2 key, as is disclosed in my prior patent, to which reference is made for details of this mechanism.

Using machine as an adding-listing machine

Although the machine is normally arranged to perform cash receipting operations, it may also be used as an ordinary adding-listing machine without requiring any changes, as is fully disclosed in my prior patent.

Operation

Although the operation of the machine is the same as that disclosed in my prior patent under control of the No. 1 and No. 2 operation control keys, a brief résumé of the operation will be given.

Figure 4:
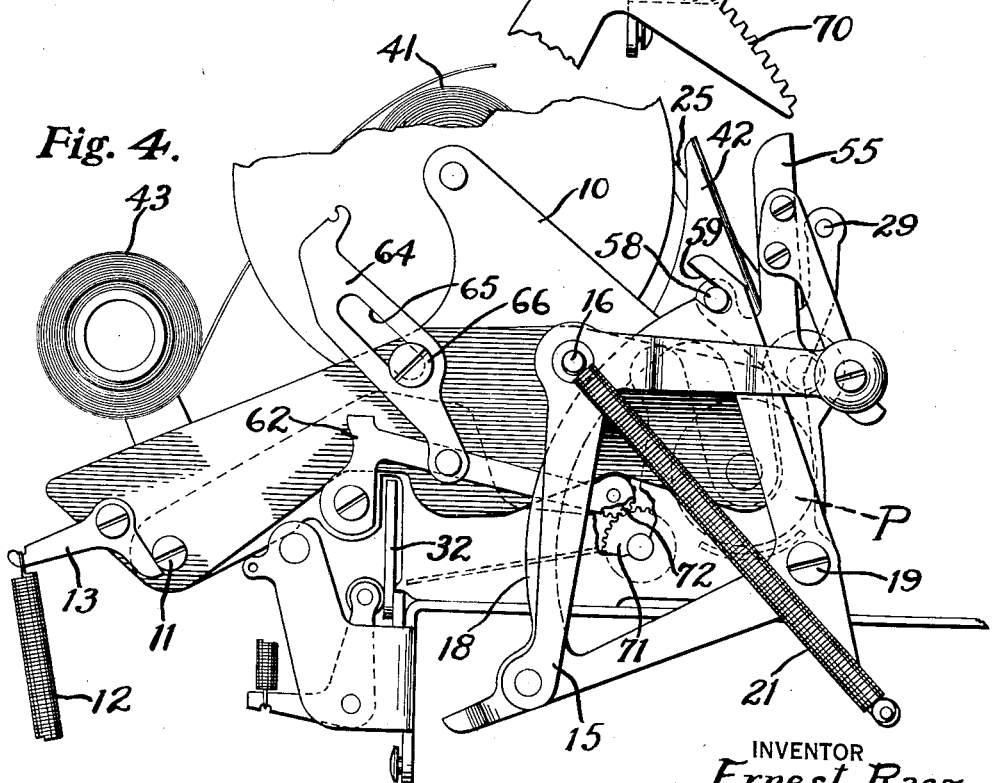
Fig. 4 is a similar view from the right side.

Under normal conditions, the platen 10 is out of printing position, as illustrated in Figs. 1 and 4, and the pressure rolls 60 and 61 are in "open-throat" position so that a work sheet may be readily inserted in the machine. These conditions occurred automatically at the close of the preceding cycle of machine operation as disclosed in my prior patent. Also, under normal conditions, the record strip is about the platen ready to receive the various entries that are made on the individual work sheets.

The operator inserts a work sheet in the machine, which is an easy operation as the front-feed throats are open, the paper table is in front-feed position to guide the sheet horizontally under the platen, and the stop 30 is in position to arrest the sheet in proper position.

Having inserted the sheet the operator pulls the handle 14 forward which moves the platen toward printing position. As this happens the throat between rolls 60—61 is automatically closed to grip the work sheet and this gripping takes place prior to the engagement of the platen with the work sheet. This holds the work sheet firmly in position as the platen moves to printing position. During the platen movement, the stop 30 for arresting the work sheet automatically is moved to inactive position so that the work sheet can be fed rearwardly during operation of the machine. When the platen reaches printing position it is latched by the latch 25.

The No. 1 operation key is then depressed which causes the machine to be given a stroke of operation. Depression of this key places the machine in "non-add" condition, conditions the "repeat" mechanism for keeping the amount key depressed, conditions an interlock with the platen, conditions the mechanism that controls the feeding action of the work sheet pressure rolls 60—61, and locks the keyboard after the No. 1 operation so that the amount on the keyboard cannot be changed.

During the "No. 1" operation of the machine, the amount entered on the keys is printed on the bill or work sheet and reproduced on the record strip. Near the end of this machine operation, and after printing has occurred, the sector arm 70 is rocked and the pressure rolls 60 and 61 are rotated to move the work sheet to a new printing position and to a position where the stub may be cut from the receipt. This movement is independent of the platen and in a direction opposite to the line spacing movements of the platen. After the machine has completed its operation it stops.

The operator then depresses the No. 2 key which causes a second or "No. 2" operation. Depression of the No. 2 key releases the No. 1 key; leaves the machine in addition condition; releases the "repeat" mechanism so that, at the end of the No. 2 operation the keys are released; conditions the interlock with the platen; and conditions the parts so that, during the machine operation, the cut-off mechanism is automatically operated and the platen is line spaced to move the record strip while the work sheet is held. Depression of this key also conditions certain parts so that, during the latter part of this second machine operation, the platen is automatically released and the sector 70 is automatically released to return to normal.

During the No. 2 operation the printing mechanism operates to print the payment a second time, but this time the amount is printed on the receipt. During the second printing operation the amount is again reproduced on the record sheet, but since this sheet is not line spaced until after the second printing operation, the second impression is over the first so that only one impression appears on the record sheet.

When the platen is released it automatically moves out of printing position to open-throat position and, at the same time, automatically opens the throat between the pressure rolls 60 and 61. This frees the work sheet for ready removal and enables another to be inserted.

It is to be understood that the structure shown is for purposes of illustration and that variations may be made without departing from the spirit and scope of the invention as defined by the appended claims.

I claim:

1. In a machine of the class described, a printing mechanism, a platen, front-feed means cooperating with said platen for holding work sheets in printing position relative to said printing mechanism, said front-feed means being movable from closed to open throat position and vice versa, a second front-feed means independent of said platen for holding said work sheets, said independent front-feed means being movable from closed to open throat position and vice versa, and means for moving both of said front-feed means to closed throat position including a link permanently connected between said front feed means and operable to cause one of said front-feed means to be moved to closed throat position prior to movement of the other of said front-feed means to enable the inserted work sheet to be held by said closed front-feed means to prevent it being disturbed by said other front-feed means.

2. In a machine of the class described, a printing mechanism, a platen, front-feed means cooperating with said platen for holding work sheets in printing position relative to said printing mechanism, said front-feed means being movable from closed to open throat position and vice versa, a second front-feed means independent of said platen for holding said work sheets, said independent front-feed means being movable from closed to open throat position and vice versa, and means for moving both of said front-feed means to closed throat position including a link permanently connecting said two front feed means and having a stud and slot connection at one end, said link being operable to cause one of said front-feed means to be moved to closed throat position prior to engagement of said platen with said sheet to enable the inserted work sheet to be held by said closed holding means to prevent it being disturbed by said other holding means.

3. In a front-feed machine of the class described, a printing mechanism, a platen frame, a platen therein and movable with said frame from printing position relative to said printing mechanism to front-feed position and vice versa, a set of front-feed pressure rolls independent of said platen for receiving front-fed work sheets, one of said rolls being mounted to move with said platen as the latter moves out of printing position, means for moving said platen from printing to front-feed position, a link permanently connected to said movable roll and to said platen frame for causing said movable pressure roll to move with said platen as the latter moves out of printing position to thereby open the throat between said rolls to receive front-fed work sheets, means for guiding a work sheet under said platen from the front and into said open throat while the platen is out of printing position, and means for moving said platen to printing position having portions adapted to move said movable pressure roll to closed throat position prior to any appreciable movement of said platen to printing position.

4. In a front-feed machine of the class described, a printing mechanism, a platen frame, a platen therein and movable with said frame from printing position relative to said printing mechanism to front-feed position and vice versa, a set of front-feed pressure rolls independent of said platen for receiving front-fed work sheets, one of said rolls being mounted to move with said platen as the latter moves out of printing position, means for moving said platen from printing to front-feed position, a link permanently connecting said movable roll and said platen frame having a stud and slot connection at one end for causing said movable pressure roll to move with said platen as the latter moves out of printing position to thereby open the throat between said rolls to receive front-fed work sheets, means for guiding a work sheet under said platen from the front and into said open throat while the platen is out of printing position, and means for moving said platen to printing position having portions adapted to move said movable pressure roll to closed throat position prior to engagement of said platen with said work sheet.

5. In a machine of the class described, a printing mechanism, a platen, front-feed means for holding work sheets in printing position relative to said printing mechanism, a second front-feed means independent of said platen for holding said work sheets, said independent work sheet holding means being movable from closed to open throat position and vice versa, a pivoted front-feed table in front of said platen and movable from front-feed position to work sheet holding position, and means for moving both of said front-feed means toward closed throat position to grip said work sheet including portions operable after movement of said front-feed means to closed throat position to cause said table to be moved to work sheet holding position.

6. In a machine of the class described, a printing mechanism, a platen, front-feed means independent of said platen for holding work sheets in printing position relative to said platen, said independent front-feed means being movable from closed to open throat position and vice versa, a pivoted front-feed table in front of said platen and movable from front-feed position to work sheet holding position, means for moving said front-feed means from open to closed throat position, and means controlled by said front-feed means during the final portion of its movement to closed throat position for causing said table to be moved to work sheet holding position following movement of said front feed means to closed throat position.

7. In a machine of the class described, a printing mechanism, a platen movable from printing position relative to said printing mechanism to a front-feed position and vice versa, a front-feed table for receiving and guiding work sheets, said table being movable from open throat position to work sheet holding position and vice versa and being in front-feed position when said platen is in front-feed position, and means operable to move said platen toward printing position, said last named means including portions acting to move said table to work sheet holding position after the platen reaches printing position to hold the inserted work sheet against said platen.

8. In a machine of the class described, a printing mechanism, a platen movable from printing position relative to said printing mechanism to a front-feed position and vice versa, a front-feed table movable from open throat position to work sheet holding position and vice versa, front-feed means independent of said platen for receiving and holding work sheets, said means being movable from closed to open throat position and vice versa and being in open throat position when said platen is in front-feed position, means for moving said platen toward printing position and said front-feed means to closed throat position to grip said work sheet, and means controlled by the movement of said platen toward printing position for retaining said table in open throat position until said platen has moved to printing position and then causing said table to be moved automatically to work sheet holding position.

9. In a machine of the class described, a printing mechanism, a platen movable from printing position relative to said printing mechanism to a front-feed position and vice versa, a front-feed table movable from open throat position to work sheet holding position and vice versa, front-feed means independent of said platen for receiving and holding work sheets, said means being movable from closed to open throat position and vice versa and being in open throat position when said platen is in front-feed position, and means for moving said platen toward printing position and said front feed means to closed throat position to grip said work sheet, said means having portions for automatically moving said table to work sheet holding position after the platen reaches printing position.

10. In a front-feed machine of the class described, a printing mechanism, a platen movable from printing position relative to said printing mechanism to front-feed position and vice versa, a set of front-feed pressure rolls independent of said platen for receiving front-fed work sheets, one of said rolls being mounted to move with said platen as the latter moves out of printing position, means for moving said platen from printing to front-feed position, means causing said movable pressure roll to move with said platen as the latter moves out of printing position to thereby open the throat between said rolls to receive front-fed work sheets, a pivoted table for guiding a work sheet under said platen from the front and into said open throat while the platen is out of printing position, and means for moving said movable pressure roll to closed throat position and said platen to printing position, said means having portions for moving said table from front-feed position to work sheet holding position after the platen reaches printing position.

11. In a front-feed machine of the class described, a printing mechanism, a platen movable from printing position relative to said printing mechanism to front-feed position and vice versa, front-feed means independent of said platen for receiving and holding front-fed work sheets, said front-feed means being movable from closed to open throat position and vice versa, a pivoted paper table in front of said platen occupying a substantially vertical position when said platen is in printing position, means operable to move said platen from printing to front-feed position and to simultaneously move said independent front-feed means to open throat position and said paper table to substantially horizontal front-feed position whereby the inserted work sheet may be removed and another inserted substantially horizontally under said platen and into said open throat from the front, and means for moving said front-feed means to closed throat position, said platen to printing position, and said paper table to substantially vertical position after the platen reaches printing position.

12. In a front-feed machine of the class described, a printing mechanism, a platen movable from printing position relative to said printing mechanism to front-feed position and vice versa, front-feed means independent of said platen for receiving and holding front-fed work sheets, said independent front-feed means being movable from closed to open throat position and vice versa and being in open throat position when said platen is in front-feed position, a pivoted table for guiding a work sheet under said platen from the front and into said open throat while said platen is in front-feed position and for holding said work sheet against said platen when said platen is in printing position, and mechanism for moving said independent front-feed means to closed throat position and said platen to printing position, said mechanism having portions operating to close said independent front-feed throat to grip the inserted work sheet prior to engagement of said work sheet by said platen as the latter moves toward printing position, and for moving said table to work sheet holding position after the platen reaches printing position.

ERNEST RACZ.